United States Patent
Somasundaram et al.

(10) Patent No.: US 11,915,325 B2
(45) Date of Patent: Feb. 27, 2024

(54) QUANTUM ENABLED RESOURCE ACTIVITY INVESTIGATION AND RESPONSE TOOL

(71) Applicant: BANK OF AMERICA CORPORATION, Charlotte, NC (US)

(72) Inventors: Arunkumar Somasundaram, TamilNadu (IN); Mohanakannan Ethiraj, TamilNadu (IN); Muhammad Riyaz Kannan, Tamil Nadu (IN); Ashok Kota, Hyderabad (IN); Vasanthkumar Pathervellai, TamilNadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 206 days.

(21) Appl. No.: 17/342,886

(22) Filed: Jun. 9, 2021

(65) Prior Publication Data
US 2022/0398671 A1  Dec. 15, 2022

(51) Int. Cl.
*G06Q 40/12* (2023.01)
*G06N 10/00* (2022.01)
*G06F 16/25* (2019.01)

(52) U.S. Cl.
CPC .......... *G06Q 40/12* (2013.12); *G06F 16/258* (2019.01); *G06N 10/00* (2019.01)

(58) Field of Classification Search
None
See application file for complete search history.

(56) References Cited

U.S. PATENT DOCUMENTS

| | | | |
|---|---|---|---|
| 7,522,060 B1 * | 4/2009 | Tumperi | G06Q 10/06 340/5.82 |
| 8,200,775 B2 | 6/2012 | Moore | |
| 9,207,672 B2 * | 12/2015 | Williams | G06N 10/00 |
| 9,400,499 B2 | 7/2016 | Williams et al. | |
| 9,774,401 B1 * | 9/2017 | Borrill | H04L 9/0852 |
| 10,592,216 B1 | 3/2020 | Richardson et al. | |
| 10,637,660 B2 * | 4/2020 | Ahn | H04L 9/3226 |
| 10,817,337 B1 | 10/2020 | Richardson et al. | |
| 10,862,465 B1 | 12/2020 | Cohen et al. | |
| 10,931,267 B1 | 2/2021 | Cohen et al. | |
| 10,985,739 B2 * | 4/2021 | Cohen | G06N 10/00 |
| 11,043,939 B1 * | 6/2021 | Szmuk | H03K 3/38 |
| 11,088,679 B2 * | 8/2021 | Cohen | H03K 19/195 |
| 11,288,121 B2 * | 3/2022 | Katabarwa | H03M 13/47 |
| 2010/0036672 A1 * | 2/2010 | Li | G06Q 10/0639 705/7.11 |
| 2010/0329459 A1 | 12/2010 | Wiseman et al. | |

(Continued)

*Primary Examiner* — Fateh M Obaid
(74) *Attorney, Agent, or Firm* — Moore & Van Allen PLLC; Nicholas C. Russell (57) ABSTRACT

The invention includes an activity investigation and response tool which comprises both a quantum computing element and a machine learning or artificial intelligence model in order to analyze historical data and build a reference point for examining real time data streams. The activity investigation and response tool may seamlessly interact with entity systems in order to transmit findings for display via classical computing systems, and potentially for human review. Qubits from historical data are entangled with real time input streams in an iterative fashion in order to locate best-correlation output and decisioning.

17 Claims, 7 Drawing Sheets

(56) References Cited

U.S. PATENT DOCUMENTS

| | | | |
|---|---|---|---|
| 2011/0142242 A1 | 6/2011 | Tanaka | |
| 2011/0228937 A1 | 9/2011 | Wiseman et al. | |
| 2012/0004948 A1* | 1/2012 | Taintor | G06Q 30/0206 705/7.29 |
| 2014/0214257 A1* | 7/2014 | Williams | G06F 1/20 701/25 |
| 2014/0341575 A1 | 11/2014 | Choi et al. | |
| 2015/0188701 A1 | 7/2015 | Nordholt et al. | |
| 2015/0369867 A1* | 12/2015 | Kanada | H02J 7/0063 324/432 |
| 2016/0248586 A1* | 8/2016 | Hughes | H04L 9/0852 |
| 2017/0221032 A1* | 8/2017 | Mazed | G06Q 20/321 |
| 2018/0109377 A1 | 4/2018 | Fu | |
| 2018/0307859 A1* | 10/2018 | LaFever | H04L 63/20 |
| 2019/0332807 A1* | 10/2019 | LaFever | G06F 21/6254 |
| 2020/0218518 A1 | 7/2020 | Gambetta et al. | |
| 2020/0342548 A1* | 10/2020 | Mazed | G06Q 30/0206 |
| 2021/0004707 A1* | 1/2021 | Gambetta | G06F 15/16 |
| 2021/0182727 A1* | 6/2021 | Xu | G01N 23/2251 |
| 2021/0232961 A1* | 7/2021 | Higa | G06N 10/00 |
| 2021/0279625 A1* | 9/2021 | Shani | G06F 12/0238 |
| 2022/0084085 A1* | 3/2022 | Rigetti | G06Q 30/0283 |

\* cited by examiner

QUANTUM ENABLED RESOURCE ACTIVITY INVESTIGATION AND RESPONSE TOOL

FIELD OF THE INVENTION

The present invention is generally related to systems and methods for enhanced analysis of transaction data.

BACKGROUND

Existing systems for monitoring resource transactions and disputes of such resource transactions may rely time consuming and inefficient processes. As such, there is a need for a system for secure, expedited, and automated processing of such information with the ability to share information between multiple parties or systems in real time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. As stated, there is a need for a system for secure, expedited, and automated processing of such information with the ability to share information between multiple parties or systems in real time.

The system and methods described herein leverage the increased speed of quantum computing versus conventional classical computing techniques in order to deliver a tool for automated, near-instant transmission of actionable reporting data for a multitude of analyzed transactions. Given the complex nature of reporting requirements across entities, policy makers, or the like, and the wide variety of transaction characteristics, reporting accuracy is crucial. For instance, while some transactions may show characteristics which would warrant further investigation, pausing, freezing, or otherwise blocking transactions from certain resource accounts may cause issues for users who own such resource accounts. Therefore, it is preferable to recognize transaction patterns in a complex and high resolution manner in order to identify potentially problematic transactions with a high degree of confidence, and to pass this transaction data on to the appropriate party for remedial action as soon as possible so that a resolution can be reached, and potential loss may be avoided.

The invention includes an activity investigation and response tool which comprises both a quantum computing element and a machine learning or artificial intelligence model in order to analyze historical data and build a reference point for examining real time data streams. The activity investigation and response tool may seamlessly interact with entity systems in order to transmit findings for display via classical computing systems, and potentially for human review. Qubits from historical data are entangled with real time input streams in an iterative fashion in order to locate best-correlation output and decisioning.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive historical data from one or more databases or entities; convert historical data to qubit format for correlation with real-time transaction data; receive real-time transaction data and redefine the real-time transaction data in qubit format; correlate qubit data of real-time transaction data with the converted historical data; generate one or more correlated assignment qubits; and output correlated assignment data in classical computing format for further review.

In some embodiments, the real-time transaction data further comprises a resource amount, one or more resource account identifiers, or one or more transacting entities.

In some embodiments, correlating qubit data of real-time transaction data with the converted historical data further comprises entangling the qubit data of real-time transaction data with the converted historical data via a quantum optimizer.

In some embodiments, the invention is further configured to generate a percentage probability score quantifying the correlation between the real-time transaction data and the converted historical data.

In some embodiments, the invention is further configured to automatically forward the correlated assignment data to one or more human users via one or more user devices.

In some embodiments, the invention is further configured to automatically transmit the correlated assignment data to one or more third party entities.

In some embodiments, the invention is further configured to receive one or more third party entity dispositions in response to the correlated assignment data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity, and may be identified using an account number, account name or the like, also referred to as an "account identifier" or "resource account identifier." Examples of technology resources include a deposit account, such as a transactional account (e.g. a banking account), a savings account, an investment account, a money market account, a time deposit, a demand deposit, a pre-paid account, a credit account, a non-monetary user datastore that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more promotions/coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system for adjustment of resource allocation based on multi-channel inputs in order to obtain information relevant to the user's business.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

Figure 1:
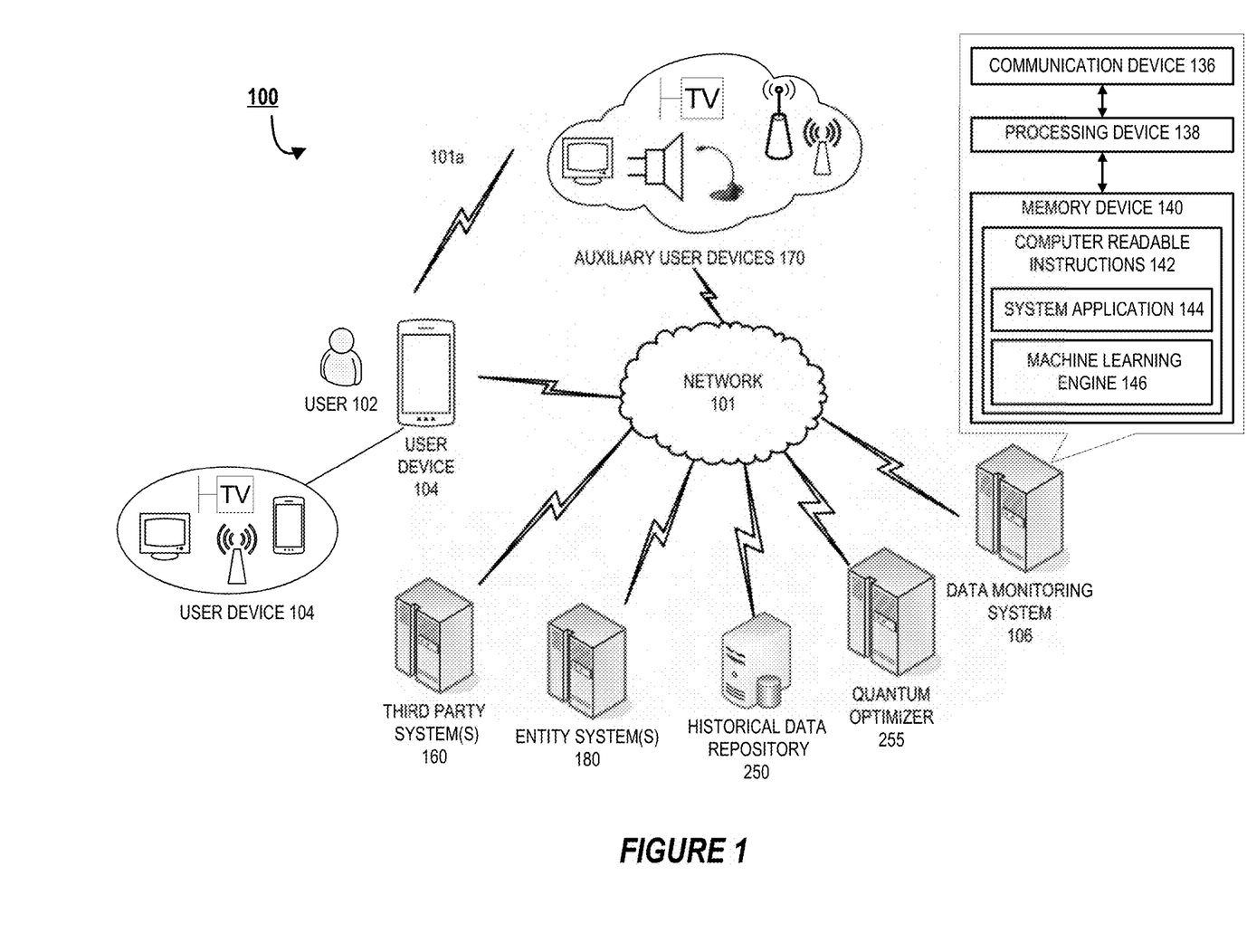
FIG. 1 depicts a system environment 100 providing a system for quantum enabled resource activity investigation and response, in accordance with one embodiment of the present invention.

FIG. 1 depicts a system environment 100 providing a system for quantum enabled resource activity investigation and response, in accordance with one embodiment of the present invention. As illustrated in FIG. 1, a data monitoring system 106, configured for providing an intelligent, proactive and responsive application or system, at a user device 104, which facilitates execution of electronic activities in an integrated manner. The resource technology system is operatively coupled, via a network 101 to one or more user devices 104, auxiliary user devices 170, to entity systems 180, historical data repository 250, third party systems 160, and other external systems/third-party servers not illustrated herein. In this way, the data monitoring system 106 can send information to and receive information from multiple user devices 104 and auxiliary user devices 170 to provide an integrated platform with multi-channel communication capabilities to a user 102, and particularly to the user device 104. At least a portion of the system is typically configured to reside on the user device 104, on the data monitoring system 106 (for example, at the system application 144), and/or on other devices and system and is an intelligent, proactive, responsive system that facilitates analysis and secure storage of information.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary user device(s) 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device (e.g., tapping an NFC enabled payment instrument at a point-of-sale (POS) terminal, wherein the POS terminal may be an auxiliary user device 170).

In some embodiments, the user 102 is an individual that wishes to conduct one or more transactions, access one or more resource accounts, access data on the data monitoring system 106, the entity system 180, or the historical data repository 250, and in some embodiments may employ the user device 104 in order to do so. In some embodiments, the user 102 may access the data monitoring system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104. In some embodiments, the user application is a user application 538, also referred to as a "user application" herein, provided by and stored on the user device 104 by the data monitoring system 106. In some embodiments the user application 538 may refer to a third party application or a user application stored on a cloud used to access the data monitoring system 106 and/or the auxiliary user device 170 through the network 101, communicate with or receive and interpret signals from auxiliary user devices 170, and the like. In some embodiments, the user application is stored on the memory device of the data monitoring system 106, and the user interface is presented on a display device of the user device 104, while in other embodiments, the user application is stored on the user device 104. It is understood that the one or more auxiliary user devices 170 may be used to further gather relevant data for the data monitoring system 106 to use in analysis and storage functions. For instance, relevant data collected from auxiliary user devices 170 may further inform the system of a user's identity, relationships to other users, or the like.

Figure 2A:
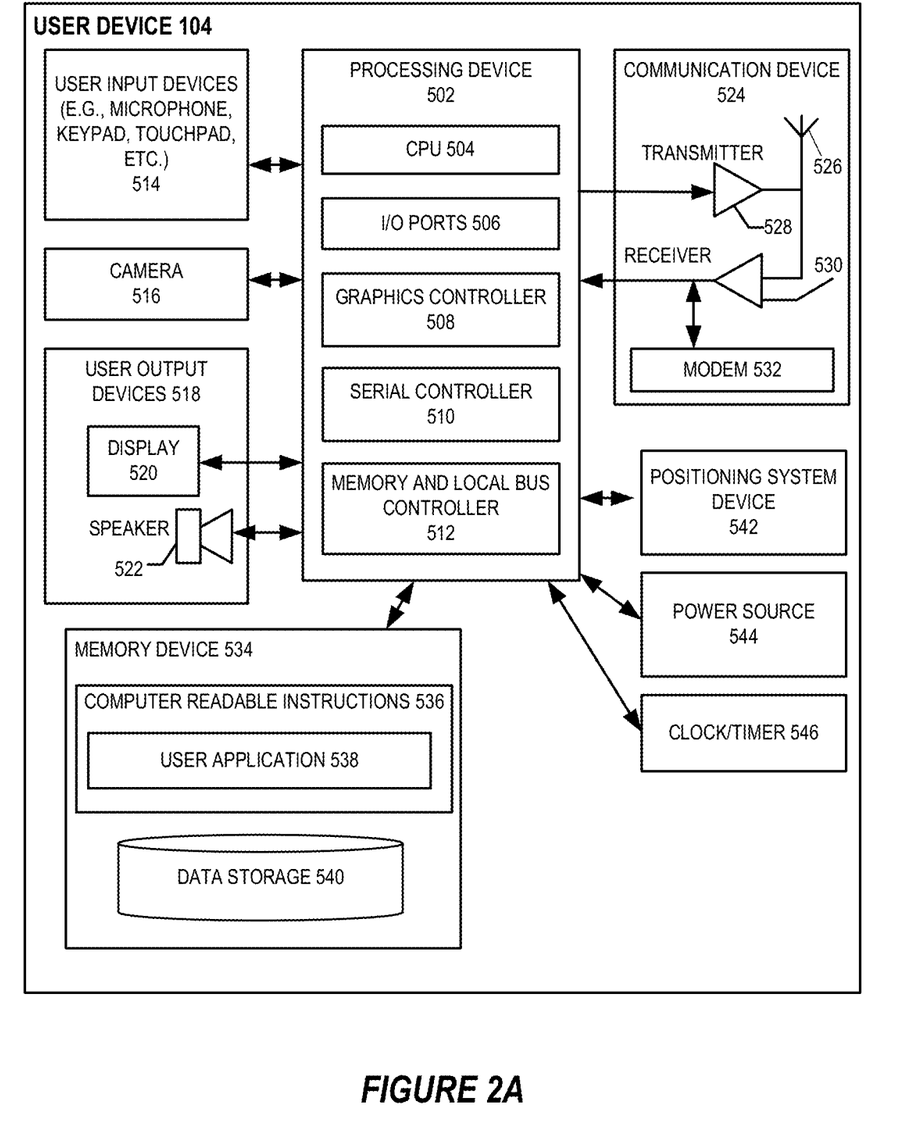
FIG. 2*a* provides a block diagram of the user device 104, in accordance with one embodiment of the invention.

The user 102 may subsequently navigate through the interface or initiate one or more user activities or resource transfers using a central user interface provided by the user application 538 of the user device 104. In some embodiments, the user 102 may be routed to a particular destination or entity location using the user device 104. In some embodiments the auxiliary user device 170 requests and/or receives additional information from the data monitoring system 106/the third party systems 160 and/or the user device 104 for authenticating the user and/or the user device, determining appropriate queues, executing information queries, and other functions. FIG. 2 provides a more in depth illustration of the user device 104.

As further illustrated in FIG. 1, the data monitoring system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the third party systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the data monitoring system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices to perform one or more steps described herein. In some embodiments, the memory device 140 includes a data storage for storing data related to user transactions and resource entity information, but not limited to data created and/or used by the system application 144. Data monitoring system 106 also includes machine learning engine 146. In some embodiments, the machine learning engine 146 is used to analyze received data in order to identify complex patterns and intelligently improve the efficiency and capability of the data monitoring system 106 to analyze received transaction data and identify patterns or anomalies, or in order to discern correlations between appropriate resolutions and specific transaction disputes or issues. In some embodiments, the machine learning engine 146 is used to analyze received data in order to extrapolate these patterns or data correlations and identify and recommend further action for dispute resolution, reporting, due diligence, information gathering, or the like. In some embodiments, the machine learning engine 146 may include supervised learning techniques, unsupervised learning techniques, or a combination of multiple machine learning models that combine supervised and unsupervised learning techniques. In some embodiments, the machine learning engine may include an adversarial neural network that uses a process of encoding and decoding in order to adversarial train one or more machine learning models to identify relevant patterns in received data received from one or more channels of communication. Transaction data may include various data related to the transfer of resources such as resources account identifiers, FIG. 1 further illustrates one or more auxiliary user devices 170, in communication with the network 101. The auxiliary user devices 170 may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the services provided to the user via the user application, that may perform one or more user activities either alone or in conjunction with the data monitoring system 106, and specifically, the system application 144, one or more auxiliary user device 170, and the like in order to provide an intelligent system for data analysis, storage, and monitoring.

Also pictured in FIG. 1 are one or more third party systems 160, which are operatively connected to the data monitoring system 106 via network 101 in order to transmit data associated with user activities, user authentication, user verification, transactions, and the like. In some embodiments, the third party system 160 may be a merchant or party to a transaction in which the user is the counterparty. In other embodiments, the third party system 160 may represent a financial institution where the user maintains one or more resource accounts. The capabilities of the data monitoring system 106 may be leveraged in some embodiments by third party systems in order to authenticate user actions based on data provided by the third party systems 160, third party applications running on the user device 104 or auxiliary user devices 170, as analyzed and compared to data stored by the data monitoring system 106, such as data stored in the historical data repository 250 or stored at entity systems 180. In some embodiments, the data storage and processing capabilities of data monitoring system 106 may be provided as a service by the data monitoring system 106 to the entity systems 180, third party systems 160, or additional systems and servers not pictured, through the use of an application programming interface ("API") designed to simplify the communication protocol for client-side requests for data or services from the data monitoring system 106. In this way, the capabilities offered by the present invention may be leveraged by multiple parties other than the those controlling the data monitoring system 106 or entity systems 180. In other embodiments, the third party systems 160 may be provided permissioned access to data of the data monitoring system 106 via a password protected web interface, password protected link, permissioned access to portions of the historical data repository 250, or a link to certain encrypted information on the historical data repository 250 which can be decrypted or contextualized at a later time in order to provide or retrieve information related to one or more transactions or ongoing transaction disputes.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, and the like), a communication device or network interface device 524, a power source 544, a clock or other timer 546, a visual capture device such as a camera 516, a positioning system device 542, such as a geo-positioning system device like a GPS device, an accelerometer, and the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application. The user application 538 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application. In some embodiments, the user application 538 allows a user 102 to access and/or interact with other systems such as the entity system 180, third party system 160, or data monitoring system 106. In one embodiment, the user 102 is a maintaining entity of a data monitoring system 106, wherein the user application enables the user 102 to configure the data monitoring system 106 or its components. In one embodiment, the user 102 is a customer of a financial entity and the user application 538 is an online banking application providing access to the entity system 180 wherein the user may interact with a resource account via a user interface of the multi-channel resource application, wherein the user interactions may be provided in a data stream as an input via multiple channels. In some embodiments, the user 102 may a customer of third party system 160 that requires the use or capabilities of the data monitoring system 106 for authorization or verification purposes.

The processing device 502 may be configured to use the communication device 524 to communicate with one or more other devices on a network 101 such as, but not limited to the entity system 180 and the data monitoring system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, millimeter wave technology communication protocols, and/or the like. The user device 104 may also be configured to operate in accordance with non-cellular communication mechanisms, such as via a wireless local area network (WLAN) or other communication/data networks. The user device 104 may also be configured to operate in accordance with an audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 180 which is connected to the user device 104 and the data monitoring system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the data monitoring system 106 to provide access to user accounts stored and maintained on the entity system 180. In some embodiments, the entity system 180 may communicate with the data monitoring system 106 during an interaction with a user 102 in real-time, wherein user interactions may be logged and processed by the data monitoring system 106 in order to analyze interactions with the user 102 and reconfigure the machine learning model in response to changes in a received or logged data stream. In one embodiment, the system is configured to receive data for decisioning, wherein the received data is processed and analyzed by the machine learning model to determine a conclusion.

Figure 2B:
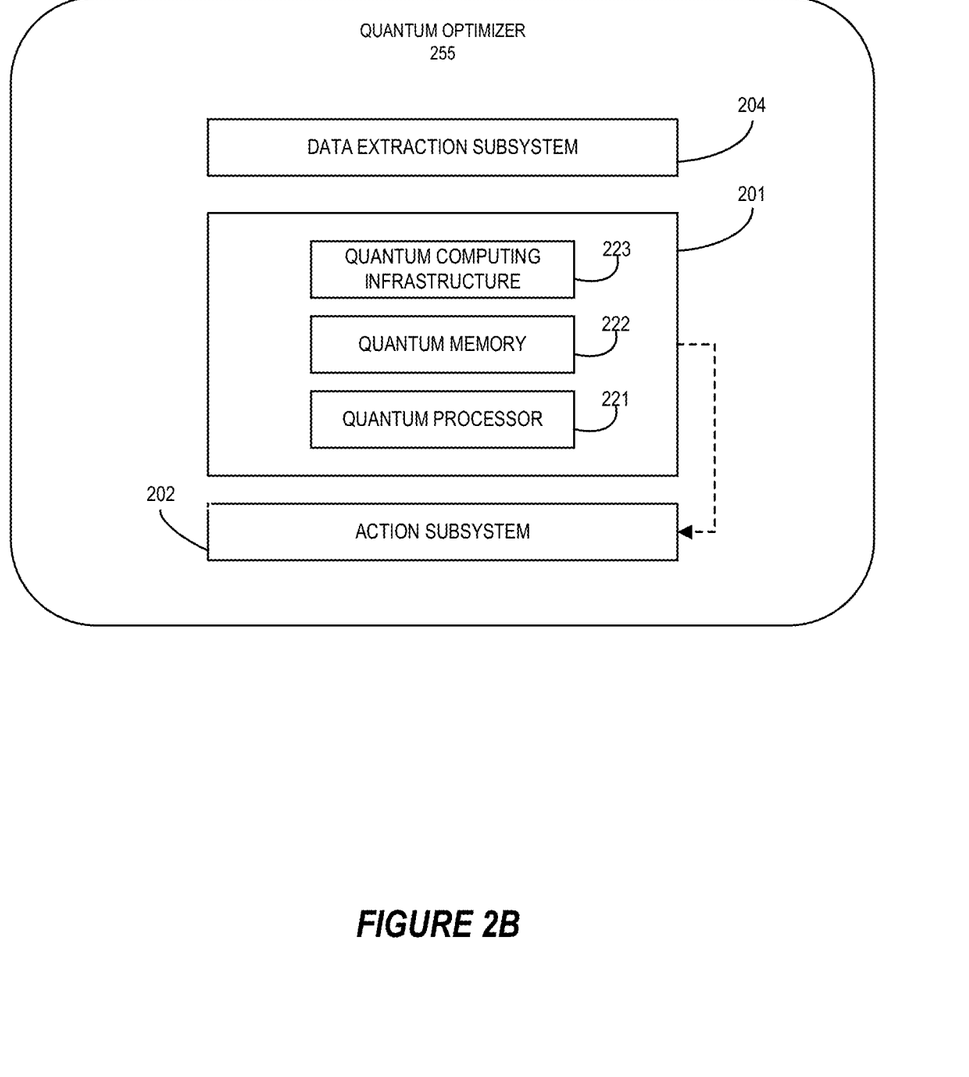
FIG. 2*b* is a schematic diagram of an exemplary quantum optimizer 255, in accordance with one embodiment of the invention.

FIG. 2b is a schematic diagram of an exemplary quantum optimizer 255, in accordance with one embodiment of the invention. It is understood that quantum optimizer 255 can be used in parallel with a classical computer to solve optimization problems. The quantum optimizer 255 is comprised of a data extraction subsystem 204, a quantum computing subsystem 201, and an action subsystem 205. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2b, the data extraction subsystem 204 communicates with the exposure analysis system 300 to extract data for optimization. It will be understood that any method of communication between the data extraction subsystem 204 and the network 101 includes, but is not limited to wired communication, Radiofrequency (RF) communication, Bluetooth®, WiFi, and the like. The data extraction subsystem 204 then formats the data for optimization in the quantum computing subsystem, such as converting data into qubits.

As further depicted in FIG. 2b, the quantum computing subsystem 201 comprises a quantum computing infrastructure 223, a quantum memory 222, and a quantum processor 221. The quantum computing infrastructure 223 comprises physical components for housing the quantum processor 221 and the quantum memory 222. The quantum computer infrastructure 223 further comprises a cryogenic refrigeration system to keep the quantum computing subsystem 201 at the desired operating conditions. In general, the quantum processor 221 is designed to perform adiabatic quantum computation and/or quantum annealing to optimize data received from the data extraction subsystem 204. The quantum memory 222 is comprised of a plurality of qubits used for storing data during operation of the quantum computing subsystem 201. In general, qubits are any two-state quantum mechanical system. It will be understood that the quantum memory 222 may be comprised of any such two-state quantum mechanical system, such as the polarization of a single photon, the spin of an electron, and the like.

The action subsystem 202 communicates the optimized data from the quantum computing subsystem 201 back to the data monitoring system 106. It will be understood that any method of communication between the data extraction subsystem 204 and the network 101 includes, but is not limited to wired communication, Radiofrequency (RF) communication, Bluetooth®, WiFi, and the like.

In accordance with the present systems and methods, an on-board quantum optimizer may be employed to perform real-time optimizations to generate reports and identify suspicious activity more quickly and more reliably than a classical digital computing system. Because a quantum computing device inherently performs optimization in its natural evolution, quantum optimizer is particularly well-suited to solve optimization problems and process large swaths of incoming real-time data, such as transaction data, user data, user device data, location data, associated metadata of any of these data sets, or the like.

Figure 3:
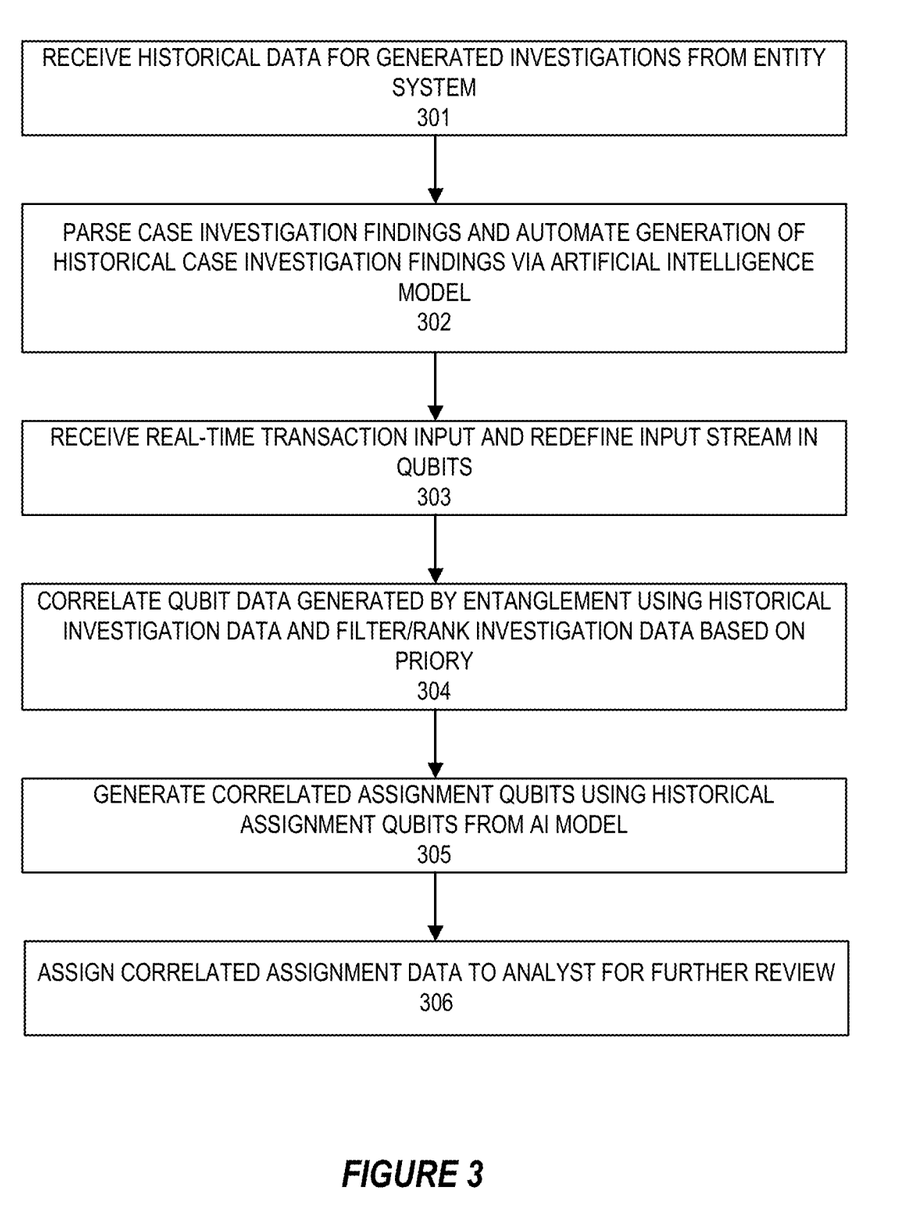
FIG. 3 is a process flow diagram illustrating a technical use case of analyzing transaction data, generating investigation output, and transmitting investigation output, in accordance with some embodiments of the invention.

FIG. 3 is a process flow diagram illustrating a technical use case of analyzing transaction data, generating investigation output, and transmitting investigation output, in accordance with some embodiments of the invention. As shown in block 301, the process begins by receiving historical data for generations investigations from entity systems 180. The system then parses case investigation findings and generates automated historical case investigation findings via the machine learning and artificial intelligence model, as indicated in block 302. Next, the system receives real-time transaction input from the entity systems 180, third party systems 160, or one or more users device(s) 104, and redefines the input stream(s) of transaction data in qubits, as shown in block 303, via the use of the quantum optimizer 255, and more specifically, the data extraction subsystem 204 of the quantum optimizer 255.

The system may then correlate qubit data generated by entanglement with historical investigation data previously generated, and filter or rank investigation data by an output priority as determined by the system's correlation results, as shown in block 304. The system may then generate correlated assignment qubits using historical assignment qubits from the machine learning and artificial intelligence model, as shown in block 305. Finally, the system assigns correlated investigation assignment data to downstream analysts for further review, as shown in block 306. Due to the nature of the quantum computing elements, the data is received, analyzed, correlated, and output is generated in near-real time, allowing downstream analysts to receive investigation data in much shorter time period versus conventional transaction investigation systems.

Figure 4:
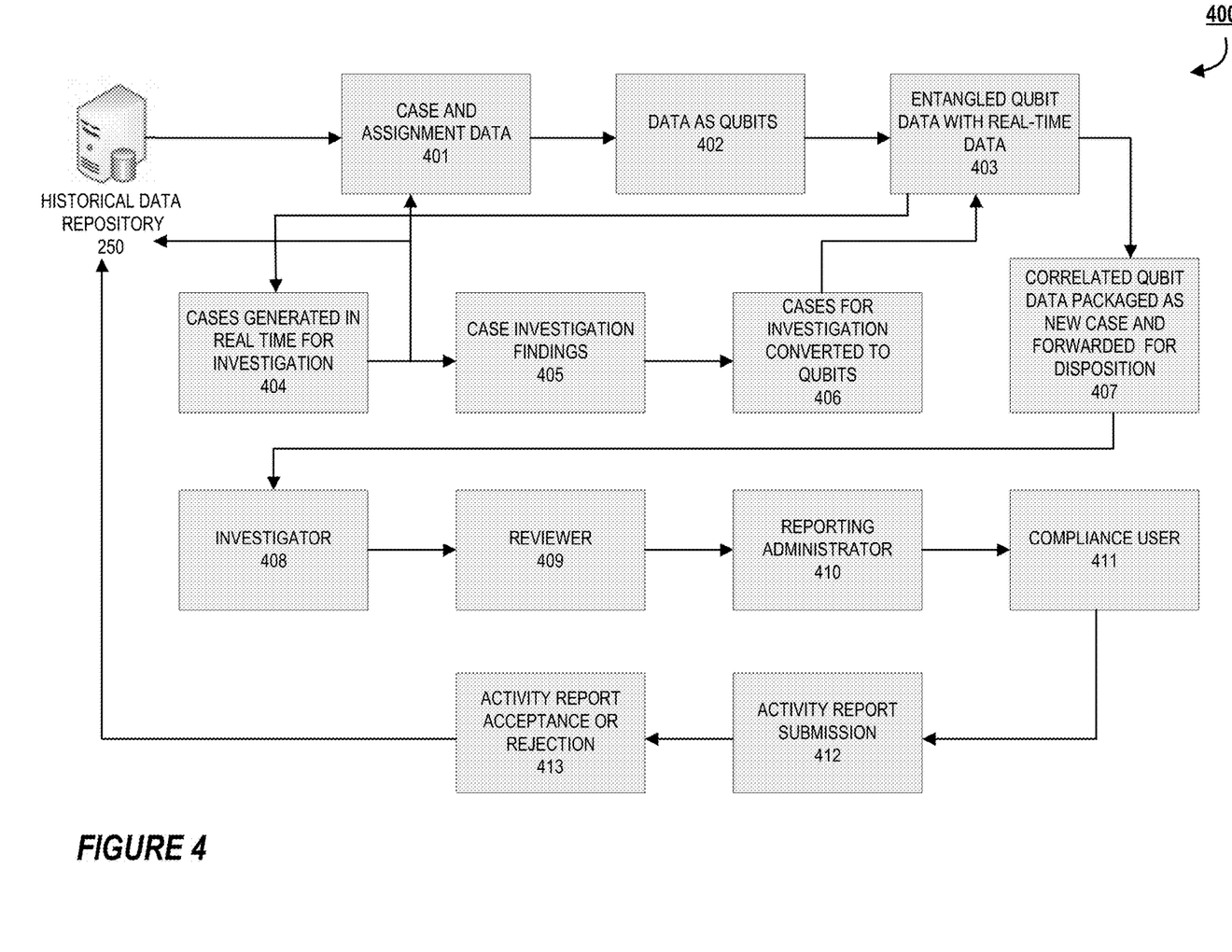
FIG. 4 is a process flow diagram 400 real time case investigation using artificial intelligence and quantum computing, in accordance with some embodiments of the invention.

FIG. 4 is a process flow diagram 400 real time case investigation using artificial intelligence and quantum computing, in accordance with some embodiments of the invention. As shown in block 401, the process begins whereby case and assignment data 401 may be sourced from historical data repository 250 for further processing and analysis. It is understood that such case data may comprise transaction and resource transfer activity data, as well as its various metadata, such as user data, user device data, or the like, wherein the transaction or resource transfer activity data considered in light of its context, as evidenced by its various metadata, may be referred to as a "case." In some embodiments, certain cases, categories of cases, types of cases, or the like, may be assigned by the system or users of the system to certain other users or entities for further review or determinations regarding the cases' validity or suspicious nature (e.g., suspected malfeasant activity or the like). In the course of assigning cases for further review or determination of validity, suspicion, or the like, the system may generate assignment data. Assignment data is appended to or correlated with the underlying case data, and thus the system may store, transmit, or refer to case and assignment data as a collective data structure such as case and assignment data 401, whether or not the two data sets are actually stored in a single file, filetype, or the like. In some embodiments, case and assignment data may be converted between various file and data throughout the processing steps of the system. For instance, as shown in block 402, data may be converted to qubits, and entangled with real-time data from incoming data streams as shown in block 403 (e.g., data received from one or more entity systems, or the like).

As shown in FIG. 4, at blow 404, this process may form a loop wherein the system is trained to generate cases in real-time for investigation based on the received case and assignment data 401 from historical data repository 250. The case and assignment data 401 from historical data repository 250 may inform the system as to what subset of cases were assigned for further investigation. As the system entangles the data as qubits 402 with real time data, this data is fed back to the case generation step 404, which may store generated cases in real-time in the historical data repository 250 as well. In addition to analyzing the case and assignment data 401, the system may also account for case investigation findings 405, and may convert the cases which were marked for further investigation into qubits, as shown in block 406, for entanglement with real-time data, again shown in block 403. This entanglement step may be repeated multiple times by the system in order to identify cases related to the real-time data, and the system may generate a probability score (e.g., a percentage score, or the like) based on the degree of statistical correlation with case and assignment data 401.

As shown in block 407, correlated qubit data may be packaged as a new case and forwarded downstream for disposition. In some embodiments, only qubit data which meets or exceeds a probability threshold may be forwarded downstream for disposition (e.g., a user may set a threshold probability score, or the system may adapt over time to learn which probability scores results in accepted suspicious activity reports (SARs), or the like). For instance, once the system has generated a determination that the new case warrants further investigation based on its degree of correlation with case and assignment data 401 being at or above a given threshold, the system may determine that the new case should be forwarded to one or more downstream parties who will make a determination as to the validity of the case or underlying transaction, resource activity, or the like. Where or to whom the case is forwarded for disposition may be partially or fully determined based on the correlated qubit data from case and assignment data 401. For example, a transaction or resource activity may share certain characteristics, or a user account may share certain activity patterns or characteristics, with incoming real-time data, and this may inform a system decision to generate a case for the real-time data, and assign it for further case disposition in the same or similar way as the correlated case and assignment data 401. It is understood that the system may not be generating a determination as to the validity or suspicious nature of the real-time data or the case itself at this stage, but rather correlating real-time data in order to quickly, in real-time or pseudo-real-time, determine data that may warrant further review. Certain aspects of the correlated qubit data may be appended with reasoning for forwarding, such as the specific characteristics of the real-time data which were correlated, the outcome of the disposition from case and assignment data 401, or the like. The qubit data may be packaged or converted back into classical data format in generating the new case for interface with legacy reporting systems.

As shown FIG. 4, the new case may be sent to an investigator 408, a reviewer 409, and a reporting administrator 410. In some embodiments, certain data may only be sent to one or more of the investigator 408, reviewer 409, and reporting administrator 410. For instance, the system may employ the use of machine learning engine 146 in order to analyze the disposition of case and assignment data 401 and determine based on case history or team history ("team" referring to the investigator 408, reviewer 409, and reporting administrator 410 collectively), that the new case generated based on real-time data has a high degree of correlation with cases previously forwarded for activity report submission. As such, the investigator 408, reviewer 409, and reporting administrator 410 may be employees of the entity which controls or manages the data monitoring system 106, wherein the investigator 408 may review the new case and determine if any additional information is required or available, the reviewer 409 may review the new case for accuracy and formatting, and reporting administrator 410 may make a final determination as to how or when the new case is submitted as an activity report to one or more additional parties.

As shown in block 412, the new case may be submitted to one or more additional parties as an activity report (e.g., one or more entities may require that cases meeting certain value thresholds, involving certain parties, accounts, or the like, are submitted for review to determine if the underlying activity is suspicious). The activity report may be accepted or rejected, as shown in block 413, and either result is recorded in the historical data repository to inform further determinations by the system.

Figure 5:
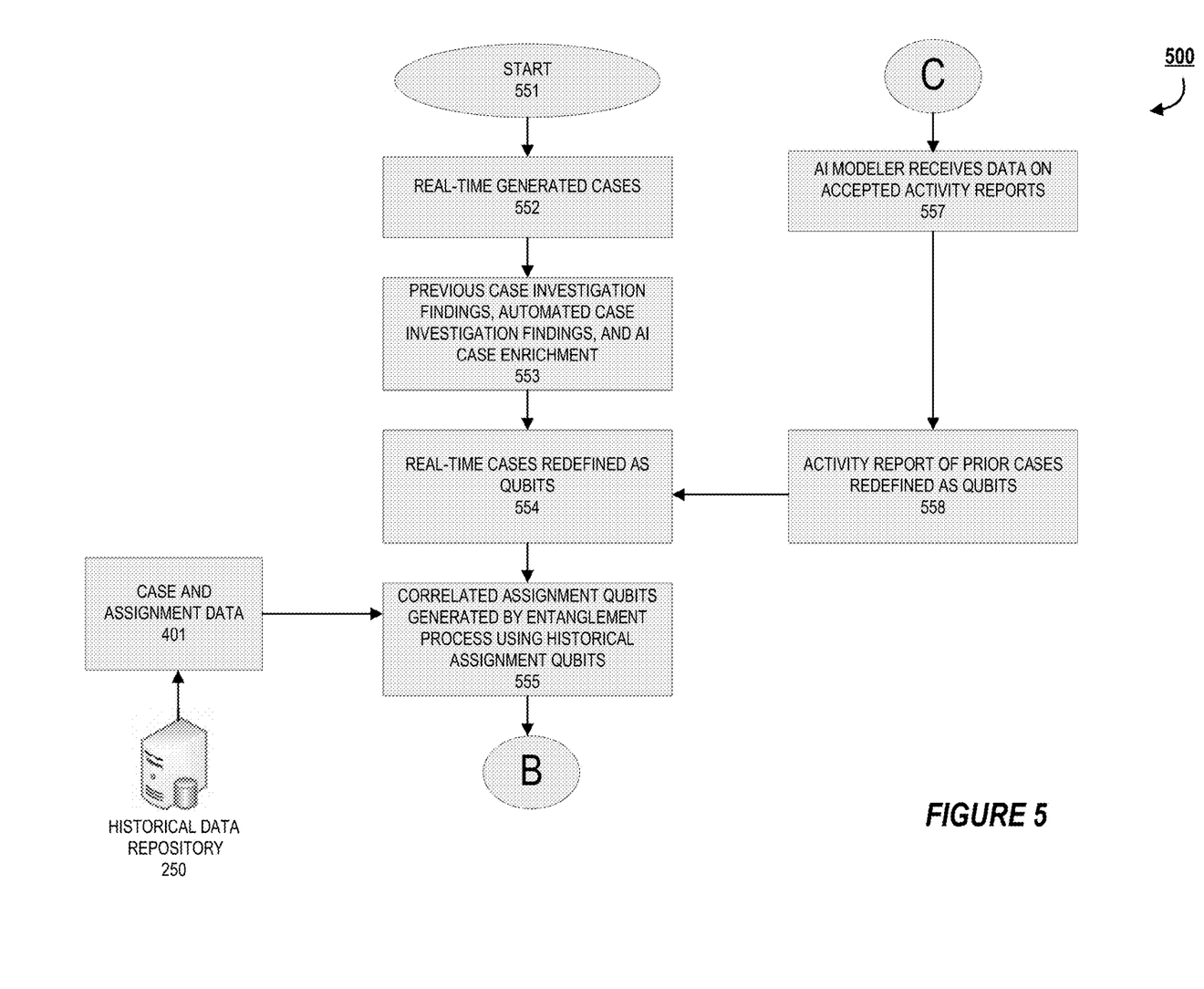
FIG. 5 is a process flow diagram 500 real time case investigation using artificial intelligence and quantum computing, in accordance with some embodiments of the invention.

FIG. 5 is a process flow diagram 500 real time case investigation using artificial intelligence and quantum computing, in accordance with some embodiments of the invention. As shown, the process starts at block 551 wherein the system may produce real-time generated cases 552, which are new cases based on incoming data on transactions, resource activity, or the like meeting certain basic thresholds or having certain characteristics (e.g., the system may generate a case for a transaction exceeding a certain amount of resources, the system may generate a case for a transaction involving one or more specific entities, users, or the like).

Next, the system may consult previous Case investigation findings, automated case investigation findings, and AI case enrichment data, as shown in block 553 in order to further correlate the real-time data and determine if the case should be further processed and redefined into qubits, as shown in block 554.

As noted on the right of FIG. 5, the system may receive data from downstream and use an artificial intelligence (AI) modeler in order to analyze the characteristics of prior cases which were successfully accepted as suspicious activity, and may redefine this data as qubits as well, as shown in block 558. This data is combined via the quantum optimizer an entangled in order to perform real-time or near real-time correlation of data, incorporating case and assignment data 401 from historical data repository 250, as shown in block 555.

Figure 6:
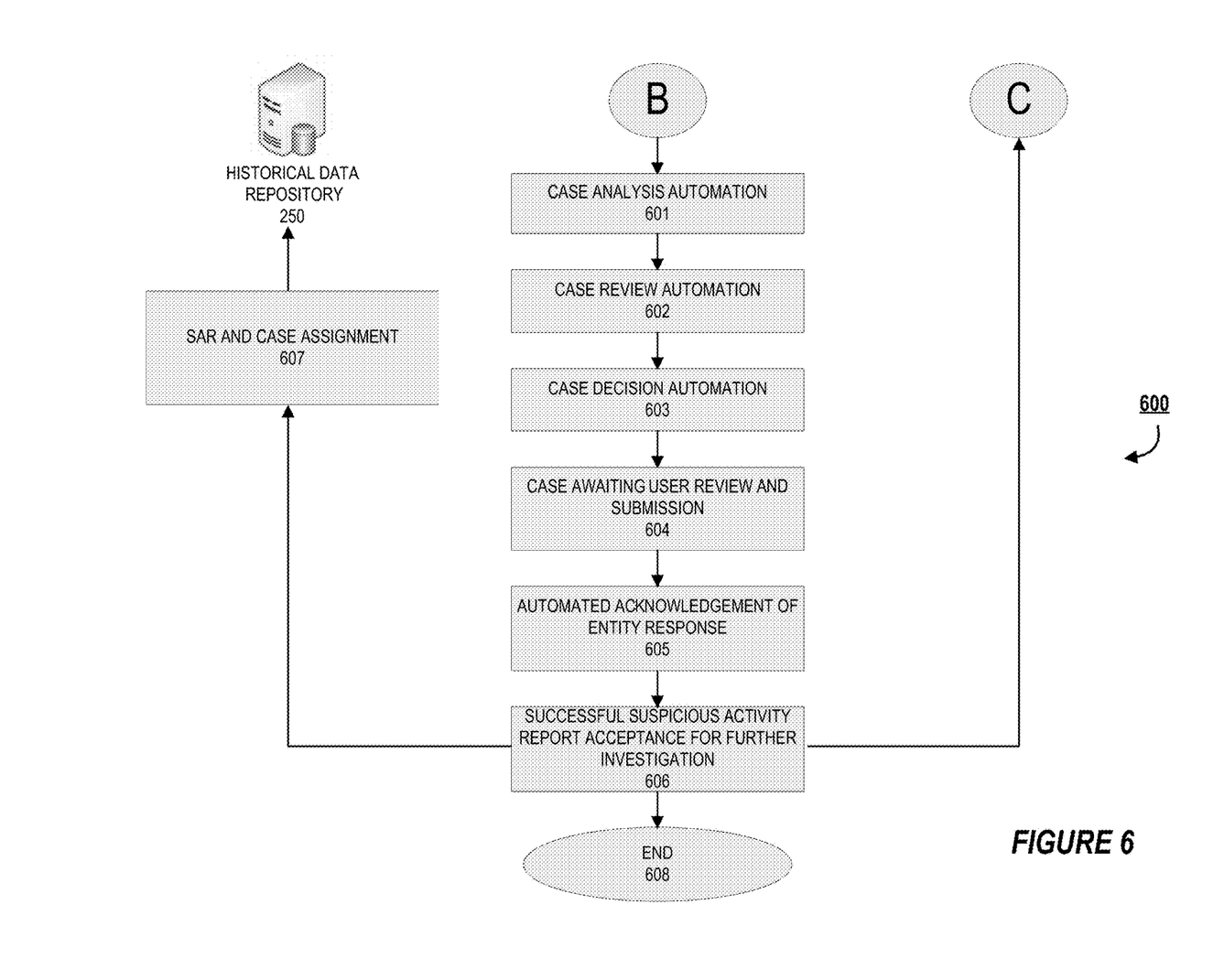
FIG. 6 is a process flow diagram 600 real time case investigation using artificial intelligence and quantum computing, in accordance with some embodiments of the invention.

FIG. 6 is a process flow diagram 600 real time case investigation using artificial intelligence and quantum computing, in accordance with some embodiments of the invention. Following the generation of assignment qubits by entanglement process using historical assignment qubits, as shown in block 555 of FIG. 5, the process proceeds in FIG. 6 by completing various automation steps. For instance, the system may automatically forward data for further analysis by a team of users, as shown in block 601, may be automatically reviewed by the system for system generated errors, as shown in block 602, and the system may further generate a recommended decision regarding whether or not the case should be forwarded for further investigation or submission as a SAR to one or more outside entities, as shown in block 603. During these processes, the system may prefill investigator and reviewer specific attributes in order to move the case to the next stage. For instance, while a generated case may include basic transaction characteristics and metadata, further analysis and review of related accounts, account history, transaction history, or the like may be required, and certain forms or data fields may be populated during this process as the system gathers necessary data. In conventional systems, this process may be done manually and may require added time and effort of human users in order to gather and review necessary data simply in order for the case to proceed through the steps of the reporting process. However, the system may automate the gathering and consolidation of necessary data in order to avoid a backlog of cases being placed in a queue for further review.

In some embodiments, it may be a necessary requirement that all cases are reviewed by a human user before being submitted to one or more outside entities for further investigation and disposition, and even after the data is analyzed, reviewed, and automatically recommended for reporting, the case may await user review and submission, as shown in block 604. Once the case is submitted for entity review, the system may receive an automated acknowledgement response from the entity, as shown in block 605. The determination that the case suspicious activity report (SAR) has been accepted by the entity for further investigation is then recorded, as shown in block 606. Before the process concludes at block 608, data from the SAR and case assignment is stored in the historical data repository 250, as shown in block 607. This data may also be looped back to the AI modeler of FIG. 5, as shown by the process terminating on the right of FIG. 6 at indicator "C".

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for quantum enabled resource activity investigation and response, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
      receive historical data from one or more databases or entities, wherein the historical data comprises case investigation findings;
      convert a subset of the historical data representing cases marked for further investigation to qubit format for correlation with real-time transaction data;
      receive real-time transaction data as resource transfer activity data and redefine the real-time transaction data in qubit format, generating qubit data of real-time transaction data;
      entangle the qubit data of real-time transaction data with the converted subset of the historical data via a quantum optimizer;
      iteratively repeat entangling of the qubit data of real-time transaction data with the converted subset of the historical data and generate a percentage score based on a degree of statistical correlation between the real-time transaction data and the subset of the converted historical data;
      based on the percentage score, correlate qubit data of real-time transaction data with the subset of the converted historical data;
      generate one or more correlated assignment qubits; and output correlated assignment data in classical computing format and transmit the correlated assignment data to a downstream analyst user.

2. The system of claim 1, wherein the real-time transaction data further comprises a resource amount, one or more resource account identifiers, or one or more transacting entities.

3. The system of claim 1, further configured to generate a percentage probability score quantifying the correlation between the real-time transaction data and the converted historical data.

4. The system of claim 1, further configured to automatically forward the correlated assignment data to one or more human users via one or more user devices.

5. The system of claim 1, further configured to automatically transmit the correlated assignment data to one or more third party entities.

6. The system of claim 1, further configured to receive one or more third party entity dispositions in response to the correlated assignment data.

7. A computer program product for per quantum enabled resource activity investigation and response, comprising a non-transitory computer-readable storage medium having computer-executable instructions for causing a classical computer apparatus comprising to:
   receive historical data from one or more databases or entities, wherein the historical data comprises case investigation findings;
   convert a subset of the historical data representing cases marked for further investigation to qubit format for correlation with real-time transaction data;
   receive real-time transaction data as resource transfer activity data and redefine the real-time transaction data in qubit format, generating qubit data of real-time transaction data;
   entangle the qubit data of real-time transaction data with the subset of the converted historical data via a quantum optimizer;
   iteratively repeat entangling of the qubit data of real-time transaction data with the subset of the converted historical data and generate a percentage score based on a degree of statistical correlation between the real-time transaction data and the subset of the converted historical data;
   based on the percentage score, correlate qubit data of real-time transaction data with the subset of the converted historical data;
   generate one or more correlated assignment qubits; and
   output correlated assignment data in classical computing format and transmit the correlated assignment data to a downstream analyst user.

8. The computer program product of claim 7, wherein the real-time transaction data further comprises a resource amount, one or more resource account identifiers, or one or more transacting entities.

9. The computer program product of claim 7, further configured to generate a percentage probability score quantifying the correlation between the real-time transaction data and the converted historical data.

10. The computer program product of claim 7, further configured to automatically forward the correlated assignment data to one or more human users via one or more user devices.

11. The computer program product of claim 7, further configured to automatically transmit the correlated assignment data to one or more third party entities.

12. A computer-implemented method for quantum enabled resource activity investigation and response, the method comprising:
   receive historical data from one or more databases or entities, wherein the historical data comprises case investigation findings;
   convert a subset of the historical data representing cases marked for further investigation to qubit format for correlation with real-time transaction data;
   receive real-time transaction data as of resource transfer activity data and redefine the real-time transaction data in qubit format, generating qubit data of real-time transaction data;
   entangle the qubit data of real-time transaction data with the subset of the converted historical data via a quantum optimizer;
   iteratively repeat entangling of the qubit data of real-time transaction data with the subset of the converted historical data and generate a percentage score based on a degree of statistical correlation between the real-time transaction data and the subset of the converted historical data
   based on the percentage score, correlate qubit data of real-time transaction data with the converted historical data;
   generate one or more correlated assignment qubits; and
   output correlated assignment data in classical computing format and transmit the correlated assignment data to a downstream analyst user.

13. The computer-implemented method of claim 12, wherein the real-time transaction data further comprises a resource amount, one or more resource account identifiers, or one or more transacting entities.

14. The computer-implemented method of claim 12, further configured to generate a percentage probability score quantifying the correlation between the real-time transaction data and the converted historical data.

15. The computer-implemented method of claim 12, further configured to automatically forward the correlated assignment data to one or more human users via one or more user devices.

16. The computer-implemented method of claim 12, further configured to automatically transmit the correlated assignment data to one or more third party entities.

17. The computer-implemented method of claim 12, further configured to receive one or more third party entity dispositions in response to the correlated assignment data.

\* \* \* \* \*